(12) United States Patent
Popp et al.

(10) Patent No.: US 8,437,928 B2
(45) Date of Patent: May 7, 2013

(54) METHOD FOR OPERATING A MULTI-STEP AUTOMATIC TRANSMISSION

(75) Inventors: Christian Popp, Kressbronn (DE); Reinhard Vollmar, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 905 days.

(21) Appl. No.: 12/107,860

(22) Filed: Apr. 23, 2008

(65) Prior Publication Data

US 2008/0275613 A1  Nov. 6, 2008

(30) Foreign Application Priority Data

May 5, 2007  (DE) .................. 10 2007 021 193

(51) Int. Cl.
*G06F 17/00*  (2006.01)
(52) U.S. Cl.
USPC ............. 701/54; 701/51; 701/55; 701/58; 477/107; 477/109; 477/148; 477/154
(58) Field of Classification Search ............ 701/54
See application file for complete search history.

(56) References Cited

U.S. PATENT DOCUMENTS

| | | | | |
|---|---|---|---|---|
| 4,955,257 A * | 9/1990 | Terayama et al. | ............ | 477/154 |
| 5,036,729 A * | 8/1991 | Nitz et al. | ............ | 477/148 |
| 5,157,608 A * | 10/1992 | Sankpal et al. | ............ | 701/58 |
| 5,259,260 A * | 11/1993 | Schneider | ............ | 74/331 |
| 5,274,553 A * | 12/1993 | Boardman | ............ | 701/55 |
| 5,642,283 A * | 6/1997 | Schulz et al. | ............ | 701/51 |
| 6,090,008 A * | 7/2000 | Hoshiya et al. | ............ | 477/84 |
| 6,254,508 B1 * | 7/2001 | Kojima et al. | ............ | 477/109 |
| 6,496,767 B1 * | 12/2002 | Lorentz | ............ | 701/55 |
| 6,623,404 B2 * | 9/2003 | Saito | ............ | 477/143 |
| 6,754,603 B2 * | 6/2004 | Turbett et al. | ............ | 702/113 |
| 6,889,130 B2 * | 5/2005 | Saitou et al. | ............ | 701/51 |
| 7,189,185 B2 * | 3/2007 | Schlecht | ............ | 477/54 |
| 7,563,198 B2 * | 7/2009 | Ayabe et al. | ............ | 477/132 |
| 2002/0035014 A1 * | 3/2002 | Saito | ............ | 477/143 |
| 2003/0027685 A1 * | 2/2003 | Watanabe et al. | ............ | 477/107 |
| 2003/0100403 A1 * | 5/2003 | Kato et al. | ............ | 477/123 |
| 2003/0167143 A1 * | 9/2003 | Turbett et al. | ............ | 702/113 |
| 2005/0060077 A1 * | 3/2005 | Slayton et al. | ............ | 701/51 |

FOREIGN PATENT DOCUMENTS

| | | |
|---|---|---|
| DE | 33 17 218 A1 | 11/1984 |
| DE | 40 31 851 A1 | 4/1992 |
| DE | 196 25 936 A1 | 1/1998 |
| DE | 103 33 183 A1 | 2/2005 |

* cited by examiner

*Primary Examiner* — Khoi Tran
*Assistant Examiner* — Jonathan L Sample
(74) *Attorney, Agent, or Firm* — Davis & Bujold, PLLC

(57) ABSTRACT

A method for operating a multi-step automatic transmission arranged in a drive train of a vehicle with a combustion engine. When downshifting from the third gear ratio to a second gear ratio, higher inertia must be shifted than when shifting from the third gear ratio to the first gear ratio. Upon a demand for a coasting downshift from the third gear ratio to the second gear ratio or to the first gear ratio with no performance demand on the combustion engine, the coasting downshift to the second gear ratio is not executed and the first gear ratio is engaged when the requirements for downshifting to the first gear ratio are met.

11 Claims, 1 Drawing Sheet

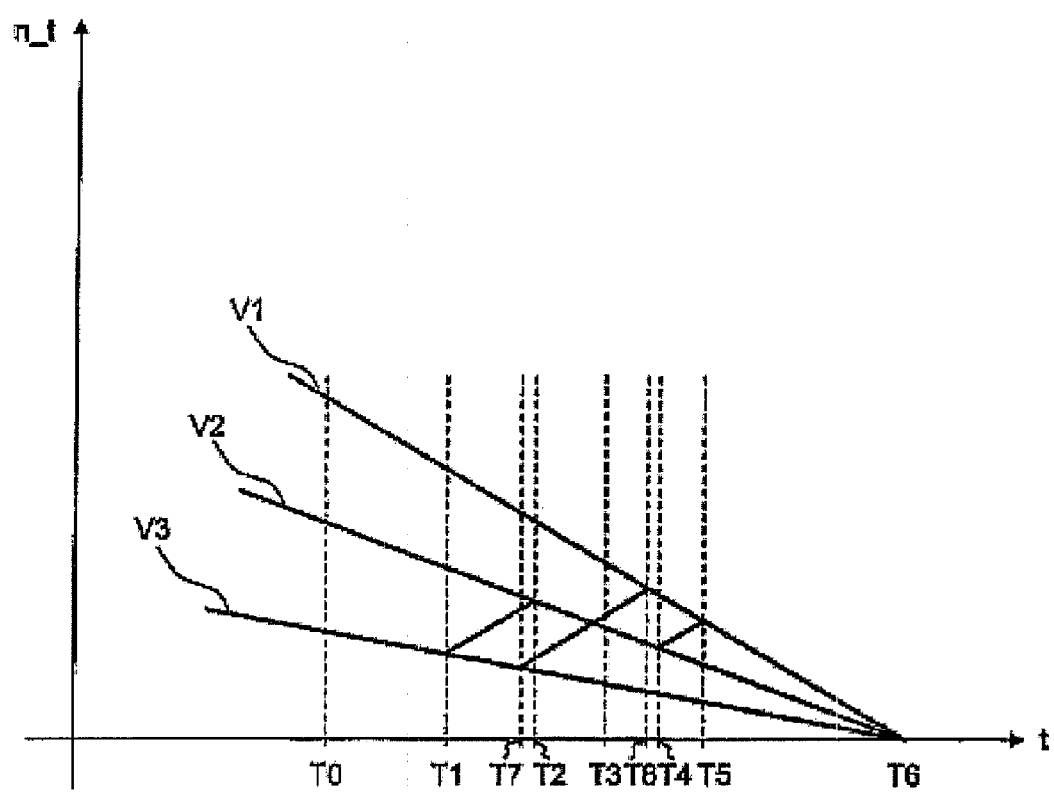

METHOD FOR OPERATING A MULTI-STEP AUTOMATIC TRANSMISSION

This application claims priority from German Application Serial No. 10 2007 021 193.9 filed May 5, 2007.

FIELD OF THE INVENTION

The invention pertains to a method for operating a multi-step automatic transmission.

BACKGROUND OF THE INVENTION

Due to the fact that shift elements, designed as a clutches or brakes, of commonly known automatic transmissions are constructed to transfer very high torques, coasting downshifts show a substantial sensitivity to defects regarding the generation of torque deliverable by a clutch to be released or engaged. This sensitivity to defects causes a degradation of desired shift comfort when the optimum shift procedure is not maintained.

Coasting downshifts which are not initiated by a driver-activated request such as activation of a selector lever or selector switch, but are initiated by way of a shift strategy programmed in a transmission control unit and which lead to irregularities in the profile of an output torque and are perceived by the driver as unpleasant.

The above problem is further intensified by the increased inertia of the rotating masses in the transmission, as well as by the inertia of the rotating masses of other components of a vehicular drive train that are involved in the shifting process, which must be accelerated or decelerated during the changing of a gear ratio. This results from the fact that during coasting downshifts, the rotating masses which, in relation to the motor of a drive train positioned ahead of the clutch, must be driven to the rotational speed level of the target gear or the gear ratio that is to be set in the transmission device by the clutch to be engaged.

This process causes a dip in the acceleration which depends on the amount of inertia, as well as on the rotational speed gradient. The level of such an acceleration dip can be reduced by way of longer shift periods, which increases the possibility, that during such a shifting procedure, the driver will initiate a performance command and/or activate the accelerator pedal. A driver-initiated performance command causes a spontaneous alteration in the desired operating condition of a vehicle drive train, whereby this operating condition must be achieved within a short operating period with the spontaneity that the driver desires.

However, this procedure has the disadvantage of increasing control and adjustment complexity which, in turn, increases the development and manufacturing costs of a transmission.

In order to reduce and/or eliminate the perceived acceleration dip at the output during coasting downshifts, changes have been implemented to support the acceleration of the inertia within the drive train during the coasting downshift by way of positive engine control.

Implementation of the positive engine control during the above-described operating profile of drive trains and/or automatic transmissions is potentially problematic, in addition the so-called revving of a combustion engine is usually audible to the driver and during unfavorable temporal sequences that can be caused by program execution times, can also negatively affect the operation of a combustion engine.

Further from practice, we know of automatic transmissions which are designed with a free wheel so as to improve shifting quality during coasting downshifts, the free wheel opening at an output rotational speed which is less than that of the driving mechanism. Such free wheels require additional space, however, and increase the manufacturing costs of a transmission unit.

It is the purpose of the present invention to provide a comfortable method of shifting during coasting downshifts in automatic transmissions without additional structural aids such as a free wheel.

SUMMARY OF THE INVENTION

With the related inventive method for operating a multi-step automatic transmission with several gear ratios, particularly of an automatic transmission of a drive train of a vehicle with a combustion engine, when downshifting from a third gear ratio to a second gear ratio, greater inertias must be shifted than when shifting from the third gear ratio to a first gear ratio; the coasting downshift to the second gear ratio is not executed when the demand for a coasting downshift from the third gear ratio to the second gear ratio or the first gear ratio is present without a performance demand on the combustion engine, and the first gear ratio is engaged when the requirements for downshifting to the first gear ratio are met.

Since the downshift to the second gear ratio is not executed and the transmission is directly shifted from the third gear ratio to the first gear ratio when the necessary requirements are met, a smaller fraction of inertia must be brought to the rotational speed of the new gear and/or target gear ratio during the coasting phase of a vehicle than would be the case in downshifting from the third gear ratio to the second gear ratio. Deviations from an ideal shifting procedure will thus cause significantly fewer irregularities in vehicle output torque, which the driver perceives as uncomfortable.

In an advantageous version of the related inventive method, downshifting to the second gear ratio is performed when the driver-activated command to engage the second gear ratio is present. This assures that a greater thrust is generated at the output than when the third gear ratio is engaged. This is particularly advantageous when the vehicle is moving downhill and a corresponding engine braking action is desired.

BRIEF DESCRIPTION OF THE DRAWINGS

The invention will now be described, by way of example, with reference to the accompanying drawings in which:

The single FIGURE shows a diagram of several rotational speed profiles of a turbine speed of a hydrodynamic torque converter of a vehicle drivetrain.

DETAILED DESCRIPTION OF THE INVENTION

The sole FIGURE shows several rotational speed profiles of a vehicle drive train, which are generated in an automatic transmission during a synchronous operating condition when a first, second or third gear ratio is engaged.

The diagram illustrates three profiles V1, V2 and V3 over a time t, each representing the profile of the turbine rotational speed of a hydrodynamic torque converter of a vehicle drive train during the synchronous operating condition when the first, second or third gear ratio is engaged in an automatic transmission of the drive train during the stopping procedure of a vehicle. Here the profile V1 illustrates the qualitative profile of the synchronous rotational speed of the turbine in the automatic transmission when the first gear ratio is engaged. The profile V2 corresponds to the profile of the synchronous rotational speed of the turbine of the hydrodynamic torque converter in the automatic transmission when the second gear ratio is engaged, while the profile V3 qualitatively represents the synchronous rotational speed of the turbine in the automatic transmission when the third gear ratio is engaged.

At a time T0 of the operating profile of the drive train and/or a coasting procedure of a vehicle on which the diagram in the illustration is based, if a transmission control device demands a gear change from the third gear ratio in the direction of the second gear ratio; a shifting element engaged in the power flow of the automatic transmission to represent the third gear ratio is released, and simultaneously a further shifting element provided in the automatic transmission to represent the second gear ratio is engaged. This procedure, which is also known as an overlapping gearshift, causes the turbine speed, beginning at a time T1, to exceed the level of the profile V3 of the synchronous turbine speed and, at a time T2, to reach the level of the profile V2 of the synchronous turbine speed, whereby at time T2 the second gear ratio is engaged in the automatic transmission.

At a time T3, which follows the time T2, if a demand is made to engage the first gear ratio from the second gear ratio, the turbine rotational speed is increased by a further overlapping gearshift starting at a time T4 from the level of the profile V2 to the level of the profile V1 whereby, at a time T5, the first gear ratio is engaged in the automatic transmission.

At a time T6, the vehicle is at a standstill and a turbine speed n_t is equal to zero. A rotational speed difference between the turbine speed n_t and the combustion engine of the drive train, which is preferably operated at the engine idle level, will be equalized in the region of the torque converter in a known manner.

During downshifting from the third gear ratio to the second gear ratio, since a significantly higher amount of inertia must be elevated from the level of the profile V3 to the level of the profile V2 than would be the case in a multiple shifting procedure when shifting from the third gear ratio to the first gear ratio, the procedure described below is implemented in order to prevent irregularities in the profile of an output torque of an output of a drive train equipped with an automatic transmission.

The term inertia, or mass moment of inertia, refers not only to the rotating bodies of the gearsets of the automatic transmission, but also to the rotating bodies of the hydrodynamic torque converter and the combustion engine, as well as additional components of the drive train that are rotatable, whose rotational speeds during shifting must be adjusted from the rotational speed equivalent to the currently engaged gear ratio to the rotational speed equivalent to the target gear.

For this reason, if there is a demand for a coasting downshift without a performance demand from a drive strategy or from the driver, to the combustion engine, the previously described downshifting from the third gear ratio to the second gear ratio will not be performed, and the second gear ratio will be skipped during a multiple downshifting procedure from the third gear ratio to the first gear ratio, which starts at a time T7 and ends at a time T8. The turbine speed n_t between times T7 and T8 during the multiple downshifting procedures, is directly increased from the level of the profile V3 to the level of the profile V1 and subsequently remains at this level until the turbine speed n_t is equal to zero at time T6.

The amount of inertia, which must be accelerated or decelerated from the third gear ratio to the first gear ratio during the coasting downshift, is thus reduced in a simple manner and irregularities in the profile of the output torque at the output, in comparison with the previously described shifting procedure where the second gear ratio is engaged prior to the first gear ratio, are reduced to a lower level which, in turn, improves driving and/or shifting comfort in a simple and economical manner.

Reference Numerals n_t turbine speed
V1-V3 profile of the turbine speed
t time
T0-T8 discrete point in time

The invention claimed is:

1. A method for operating a multi-step automatic transmission, having several gear ratios, of a drive train of a vehicle, with a combustion engine, the steps comprising:
   detecting a demand for a coasting downshift in which a greater mass moment of inertia must be shifted in a coasting downshift from a third gear ratio to a second gear ratio than in a coasting downshift from the third gear ratio to a first gear ratio;
   suppressing, via a transmission control unit, the coasting downshift to the second gear ratio from the third gear ratio when the demand for the coasting downshift from the third gear ratio to one of the second gear ratio or the first gear ratio occurs without a performance demand being placed on the combustion engine, and
   engaging, via the transmission control unit, the first gear ratio when requirements for the coasting downshift from the third gear ratio to the first gear ratio are met.

2. The method according to claim 1 further comprising the step of performing the coasting downshift from the third gear ratio to the second gear ratio when a driver makes a specific demand for a downshift.

3. A method of downshifting a multi-step automatic transmission of a drive train of a vehicle having a combustion engine, the steps comprising:
   detecting a demand for a coasting downshift in which a change of mass moment of inertia is greater for a downshift from a third gear ratio to a second gear ratio than a change of inertia for a downshift from the third gear ratio to a first gear.
   bypassing with a transmission control unit the downshift from the third gear ratio to the second gear, when the demand for the downshift from the third gear ratio to the second gear ratio is made without a demand being made for performance of the combustion engine; and
   engaging, via the transmission control unit, the first gear ratio when requirements for the coasting downshift from the third gear ratio to the first gear ratio are met.

4. The method according to claim 3, further comprising the step of downshifting the automatic transmission from the third gear ratio to the second gear ratio when a driver makes the specific demand for performance of the combustion engine.

5. A method of reducing output torque of a drive train of a vehicle to slow the vehicle during a stopping procedure, the drive train having a combustion engine and a multi-step automatic transmission, the method comprising the steps of:
   initiating a coasting downshift with a transmission control unit to shift the transmission from a third gear ratio to one of a second gear ratio and a first gear ratio;
   downshifting the transmission from the third gear ratio to the second gear ratio, via the transmission control unit, only if a demand is made on the combustion engine for increased acceleration;
   downshifting the transmission from the third gear ratio directly to the first gear ratio, via the transmission control unit, if no demand is made on the combustion engine for increased acceleration; and reducing the output torque of the drive train, to slow the vehicle, by engaging the first gear ratio, via the transmission control unit, when requirements for the downshift from the third gear ratio to the first gear ratio are met;

wherein during the downshifting a change of mass moment of inertia is greater for the downshift from the third gear ratio to the second gear ratio than a change of inertia for the downshift from the third gear ratio to the first gear ratio.

6. The method according to claim 5, further comprising the step of downshifting from the third gear ratio to the second gear ratio when a driver makes a specific demand.

7. The method according to claim 5, further comprising the step of continuously increasing a turbine speed beginning from at a time coincident with a disengagement of the third gear ratio to a time coincident with an engagement of one of a second gear ratio and a first gear ratio.

8. The method according to claim 7, further comprising the step of detecting the demand for a coasting downshift.

9. The method according to claim 7, further comprising the step of having a driver initiate the demand made on the combustion engine for increased acceleration.

10. The method according to claim 7, further comprising the step of employing a drive strategy to initiate the demand made on the combustion engine for increased acceleration.

11. A method of reducing output torque of a drive train of a vehicle to slow the vehicle during a stopping procedure, the drive train having a combustion engine and a multi-step automatic transmission, the method comprising the steps of:

initiating a coasting downshift with a transmission control unit to shift the transmission from a third gear ratio to one of a second gear ratio and a first gear ratio;

downshifting the transmission from the third gear ratio to the second gear ratio, via the transmission control unit, only if a demand is made on the combustion engine for increased acceleration;

downshifting the transmission from the third gear ratio directly to the first gear ratio, via the transmission control unit, if no demand is made on the combustion engine for increased acceleration; and reducing the output torque of the drive train, to slow the vehicle, by engaging the first gear ratio, via the transmission control unit, when requirements for the downshift from the third gear ratio to the first gear ratio are met;

detecting the demand for a coasting downshift;

continuously increasing a turbine speed beginning from at a time coincident with a disengagement of the third gear ratio to a time coincident with an engagement of one of a second gear ratio and a first gear ratio; and employing one of a driver and a drive strategy to initiate the demand made on the combustion engine for increased acceleration wherein during the downshifting a change of mass moment of inertia is greater for the downshift from the third gear ratio to the second gear ratio than a change of inertia for the downshift from the third gear ratio to the first gear ratio.

* * * * *